US011017605B2

United States Patent
Maneri

(10) Patent No.: US 11,017,605 B2
(45) Date of Patent: May 25, 2021

(54) METHOD AND SYSTEM FOR ADDRESSING AND SEGMENTING PORTIONS OF THE REAL WORLD FOR VISUAL DIGITAL AUTHORING IN A MIXED REALITY ENVIRONMENT

(71) Applicant: Unity IPR ApS, Copenhagen K (DK)

(72) Inventor: Andrew Peter Maneri, Bellevue, WA (US)

(73) Assignee: Unity IPR ApS, Copenhagen (DK)

( * ) Notice: Subject to any disclaimer, the term of this patent is extended or adjusted under 35 U.S.C. 154(b) by 0 days.

(21) Appl. No.: 16/660,746

(22) Filed: Oct. 22, 2019

(65) Prior Publication Data

US 2020/0126310 A1 Apr. 23, 2020

Related U.S. Application Data

(60) Provisional application No. 62/749,064, filed on Oct. 22, 2018.

(51) Int. Cl.
*G06T 19/00* (2011.01)
*G06T 7/70* (2017.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
None
See application file for complete search history.

(56) References Cited

U.S. PATENT DOCUMENTS 9,595,083 B1 * 3/2017 Smith ................. G06F 3/012
2004/0168117 A1 * 8/2004 Renaud ............... G09B 23/28
715/201

(Continued)

FOREIGN PATENT DOCUMENTS

WO 2016071690 A1 5/2016
WO 2020083944 A1 4/2020

OTHER PUBLICATIONS

"International Application Serial No. PCT/EP2019 078774, International Search Report dated Jan. 15, 2020", 3 pgs.
(Continued)

*Primary Examiner* — Joni Hsu
(74) *Attorney, Agent, or Firm* — Schwegman Lundberg & Woessner, P.A.

(57) ABSTRACT

A method of generating a digital island is disclosed. A base shape of a digital island virtual object is created with respect to a local coordinate system of a digital island. Conditions are associated with the digital island. The conditions include criteria for properties of objects within an environment. Additional virtual objects are associated with the digital island. Data describing the environment is received. The data is analyzed to determine one or more parts of the environment that match the conditions. Based on the matching of conditions, a display of the digital island is positioned, scaled, and oriented in a mixed reality display device contemporaneously with a view of the environment. The digital island with is aligned with at least one part of the one or more parts based on the conditions and a movement of one or more sensors and the mixed reality display device.

17 Claims, 6 Drawing Sheets

(51) Int. Cl.
*G06F 3/01* (2006.01)
*G06T 19/20* (2011.01)
*G02B 27/01* (2006.01)
*G06K 9/00* (2006.01)

(52) U.S. Cl.
CPC .............. *G06F 3/012* (2013.01); *G06F 3/017* (2013.01); *G06K 9/00671* (2013.01); *G06T 7/70* (2017.01); *G06T 19/20* (2013.01); *G02B 2027/014* (2013.01); *G02B 2027/0138* (2013.01)

(56) References Cited

U.S. PATENT DOCUMENTS

| | | | |
|---|---|---|---|
| 2009/0070426 A1* | 3/2009 | McCauley | G06Q 10/10 709/205 |
| 2014/0049559 A1* | 2/2014 | Fleck | G06T 19/006 345/633 |
| 2017/0053445 A1* | 2/2017 | Chen | H04N 13/344 |
| 2019/0155387 A1* | 5/2019 | Saboune | G06F 3/011 |
| 2019/0362559 A1* | 11/2019 | Dai | G06T 7/33 |
| 2020/0129850 A1* | 4/2020 | Ohashi | A63F 13/213 |
| 2020/0184736 A1* | 6/2020 | Mihara | G06T 19/00 |

OTHER PUBLICATIONS

"International Application Serial No. PCT/EP2019 078774, Written Opinion dated Jan. 15, 2020", 8 pgs.

International Application Serial No. PCT/EP2019/078774, Written Opinion dated Oct. 7, 2020, 9 pgs.

International Application Serial No. PCT/EP2019/078774, International Preliminary Report on Patentability dated Feb. 26, 2021, 9 pgs.

* cited by examiner

METHOD AND SYSTEM FOR ADDRESSING AND SEGMENTING PORTIONS OF THE REAL WORLD FOR VISUAL DIGITAL AUTHORING IN A MIXED REALITY ENVIRONMENT

CROSS-REFERENCE TO RELATED APPLICATIONS

This application claims the benefit of U.S. Provisional Application No. 62/749,064, filed Oct. 22, 2018, which is incorporated by reference herein in its entirety.

TECHNICAL FIELD

The present invention relates to the field of tools for use in creating and manipulating digital content for mixed reality environments.

BACKGROUND OF THE INVENTION

When creating and editing digital content such as games and applications within a mixed reality (MR) environment, using a traditional coordinate system is problematic due to the dynamic nature of the real world on which virtual objects are placed. The problems with the coordinate system make direct visual authoring (e.g., creation and editing) of mixed reality experiences nearly impossible. Direct visual authoring of mixed reality experiences involves a user directly manipulating digital content as it appears in a mixed reality environment via a mobile device (e.g., either a head mounted display or a mobile phone or tablet). The digital content must be placed, oriented, scaled, and given properties during the authoring phase so that it appears as desired by the author during execution time (e.g., during game or simulation runtime). For example, when authoring an MR experience that is targeted to execute (e.g., be displayed) on a real-world table, there is no definitive place to put the content at edit-time. This is because during the creation process, an author cannot know certain facts about the environment and the user device at runtime, including: the location and orientation of a table in the real world relative to the local environment, where the user device will put the table in a digital coordinate frame, whether there is a table in the real-world environment and if so, whether there are more than one table in the environment, the dimensions of a table, and so on. Many missing details about the runtime MR environment make it difficult, and sometimes impossible, to efficiently and directly author digital content. Currently, MR Content has to be authored in an isolation view, packaged in an application which is executed on a device, applied to a real world surface manually, and then examined to see if some part of it is broken (e.g., misaligned, not scaled properly, and the like). If something is broken, a user (e.g., developer) returns to the isolation view, edits the content by guessing what changes are needed, re-deploys into an application, re-executes the application on device, and repeats as necessary leading to a slow, inefficient workflow.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
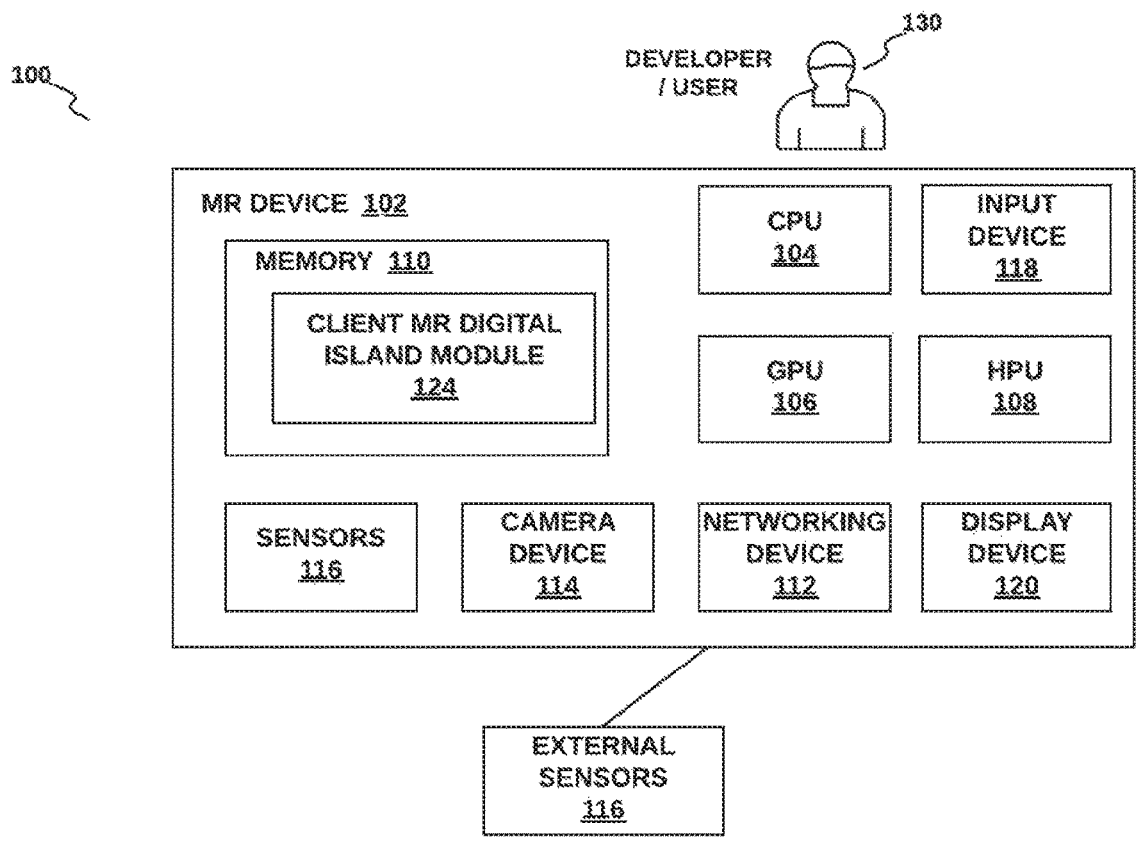
FIG. 1 is a schematic illustrating an MR Digital Island system, in accordance with one embodiment.

The description that follows describes systems, methods, techniques, instruction sequences, and computing machine program products that constitute illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

In example embodiments, a method of generating a digital island is disclosed. A base shape of a digital island virtual object is created with respect to a local coordinate system of a digital island. Conditions are associated with the digital island. The conditions include criteria for properties of objects within an environment. Additional virtual objects are associated with the digital island. Data describing the environment is received. The data is analyzed to determine one or more parts of the environment that match the conditions. Based on the matching of conditions, a display of the digital island is positioned, scaled, and oriented in a mixed reality display device contemporaneously with a view of the environment. The digital island with is aligned with at least one part of the one or more parts based on the conditions and a movement of one or more sensors and the mixed reality display device.

The present invention includes apparatuses which perform the methods, one or more operations or one or more combinations of operations described herein, including data processing systems which perform these methods and computer readable media having instructions which, when executed on data processing systems, cause the systems to perform these methods, the operations, or combinations of operations, including non-routine and unconventional operations.

The term 'game' used herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, and the like), 3D digital environments (e.g., 3D game environments, 3D simulation environments, 3D content creation environment, virtual reality environments, and the like), and augmented reality environments that include both a digital (e.g., virtual) component and a real-world component.

The term 'game object', used herein is understood to include any digital object or digital element within an environment. A game object can represent (e.g., in a corresponding data structure) almost anything within the environment; including characters, weapons, scene elements (e.g., buildings, trees, cars, treasures, and the like), backgrounds (e.g., terrain, sky, and the like), lights, cameras, effects (e.g., sound and visual), animation, and more. A game object is associated with data that defines properties and behavior for the object.

The terms 'asset', 'game asset', and 'digital asset', used herein are understood to include any data that can be used to describe a game object or can be used to describe an aspect of a game or project. For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more game objects within a game at runtime.

The term 'build' and 'game build' used herein should be understood to include a compiled binary code of a game which can be executed on a device, and which, when executed can provide a playable version of the game (e.g., playable by a human or by an artificial intelligence agent).

The term 'runtime' used herein should be understood to include a time during which a program (e.g., an application, a video game, a simulation, and the like) is running, or executing (e.g., executing programming code). The term should be understood to include a time during which a video game is being played by a human user or an artificial intelligence agent.

Throughout the description herein, the term 'mixed reality' (MR) should be understood to include all combined environments in the spectrum between reality and virtual reality (VR) including virtual reality, augmented reality (AR) and augmented virtuality.

The terms 'client' and 'application client' used throughout the description herein are understood to include a software client or software application that can access data and services on a server, including accessing over a network.

There is described herein a mixed reality Digital Island system which provides visual authoring (e.g., content creation) and debugging of digital content for mixed reality applications while in a mixed reality environment. Direct visual authoring (e.g., creation and editing) of mixed reality experiences involves direct manipulation of (e.g., by a human user) digital content as it appears in the mixed reality environment via a mobile device (e.g., a head mounted display, a mobile phone, a tablet, and the like). During the authoring, the digital content is placed, oriented, scaled, and given properties so that the digital content is displayed as desired by the author during an execution time (e.g., during a game or simulation runtime).

Using the MR Digital Island system to create digital content in mixed reality, an author can determine if there is an inconsistency with the digital content and the integration of the digital content in the environment just by observing the displaying of the digital content contemporaneously with the environment. For example, an author could see if a virtual object is superimposed halfway into a wall, or if a specific gameplay goal cannot be reached because there is no path leading to the goal. Furthermore, using the MR Digital Island system, an author without an MR device (e.g., a desktop computer or virtual reality headset) can reasonably author MR content and know how it will look and behave in real-life. This is an effective and efficient way to author.

An MR Digital Island system and associated methods are described herein. The MR Digital Island system is configured to display and manipulate digital content within an MR environment. In an example embodiment, a user (e.g., a wearer of an HMD, or someone holding a smartphone, tablet, or other MR-capable device) experiences the MR environment as presented by the MR Digital Island system via an MR device. The MR environment includes a view of the real world (e.g., immediate surroundings of the MR device) along with displayed virtual content provided by the MR Digital Island system. The MR device, in some embodiments, includes a forward-facing camera configured to capture digital video or images of the real world around the MR device, optionally including depth data, which the MR Digital Island system may analyze to provide some of the MR Digital Island features described herein.

In some embodiments, the MR Digital Island system and the various associated hardware and software components described herein may provide virtual reality (VR) content instead of, or in addition to, AR content. It should be understood that the systems and methods described herein may be performed with AR content and, as such, the scope of this disclosure covers both AR and VR environments and applications.

Turning now to the drawings, systems and methods for providing visual authoring (e.g., content creation) and debugging of digital content for mixed reality applications while in a mixed reality environment in accordance with embodiments of the invention are illustrated. FIG. 1 is a diagram of an example MR Digital Island system 100 and associated devices configured to provide MR Digital Island functionality to a user 130. In the example embodiment, the MR Digital Island system 100 includes a MR device 102 operated by the user 130. The MR device 102 is a computing device capable of providing a mixed reality experience to the user 130. In some embodiments, the MR device 102 is a head-mounted display (HMD) device worn by the user 130, such as an augmented reality (AR) or virtual reality (VR) visor (e.g., Google Glass®, HTC Vive®, Microsoft HoloLens®, and so forth). In other embodiments, the MR device 102 is a mobile computing device, such as a smartphone or a tablet computer.

In the example embodiment, the MR device 102 includes one or more central processing units (CPUs) 104, graphics processing units (GPUs) 106, and optionally holographic processing units (HPUs) 108. The processing device 104 is any type of processor, processor assembly comprising multiple processing elements (not shown), having access to a memory 110 to retrieve instructions stored thereon, and execute such instructions. Upon execution of such instructions, the instructions implement the processing device 104 to perform a series of tasks (e.g., as described herein in reference to FIG. 2). The MR device 102 can also include one or more networking devices 112 (e.g., wired or wireless network adapters for communicating over a network including a cellular network, a Wi-Fi network, the Internet, and so forth) for communicating across a network 150. The MR device 102 further includes one or more camera devices 114 which may be configured to capture digital video of the real world near the MR device 102 during operation. The MR device 102 may also include one or more sensors 116, such as a global positioning system (GPS) receiver (e.g., for determining a GPS location of the MR device 102), biometric sensors (e.g., for capturing biometric data of the user 130), motion or position sensors (e.g., for capturing position data and motion data of the user 130 or other objects in proximity to the MR device 102), or an audio microphone (e.g., for capturing sound data). Some sensors 116 may be external to the MR device 102, and may be configured to wirelessly communicate with the MR device 102 (e.g., such as used in the Microsoft Kinect®, Vive Tracker™, MIT's Lidar sensor, or MIT's wireless emotion detector).

The MR device 102 also includes one or more input devices 118 such as, for example, a keyboard or keypad, mouse, pointing device, touchscreen, a microphone, a camera, a hand-held device or the like (e.g., hand motion tracking device) for inputting information in the form of a data signal readable by the processing device 104. The MR device 102 further includes one or more display devices 120, such as a touchscreen of a tablet or smartphone, or lenses or visor of a VR or AR HMD, which may be configured to display virtual objects to the user 130 in conjunction with a real-world view.

The MR device 102 also includes a memory 110 configured to store a MR Digital Island module 124. The memory 110 can be any type of memory device, such as random access memory, read only or rewritable memory, internal processor caches, and the like.

In accordance with an embodiment, the client MR Digital Island module 124, executing on the MR device 102 (e.g., an HMD), may be configured to capture data from the camera device 114 or sensors 116 to perform various functions of the MR Digital Island system 100. In the example embodiment, the camera device 114 and sensors 116 capture data from an environment surrounding the device 102, the data including video data, audio data, depth data, GPS location data, and the like. The client module 124 may be configured to analyze the sensor data directly, or analyze processed sensor data (e.g., a real-time list of detected and identified objects, object shape data, depth maps, and the like).

In accordance with an embodiment a Digital Island is a digital object that occupies a variable size volume of space in which a coordinate system is stable and which can include digital objects and which can be placed and manipulated within an MR environment. A Digital Island can represent a real object in the real world (e.g., a table, a couch, a chair, a light, a bench, and the like). A Digital Island can represent part of a real object in the real world (e.g., the top surface of a table). For example, a Digital Island can be a virtual plane when it is representing a real flat surface in the real world (e.g., the top of a table). For more elaborate objects, (e.g., a couch, a chair, a light, etc.) the Digital Island could instead be represented by a 3D model for the object. In accordance with an embodiment, a Digital Island includes a surface of the 3D model.

In accordance with an embodiment, the Digital Island includes data that describes one or more conditions (e.g., criteria) that provide limitations of real world properties of a real world object, whereby the conditions must be satisfied in order for the Digital Island to be placed within an MR environment on or near the real world object. A condition can include location criteria, proximity criteria, orientation criteria, lighting criteria, color criteria, texture criteria and any other property of a mixed reality environment or any other property of a real world object. The conditions associated with a Digital Island specify where and how the Digital Island can be placed within an MR environment, including position, orientation, and scale of the Digital Island. In accordance with an embodiment, the MR Digital Island module 124 determines an optimal scene layout in an MR environment, for any combination of a plurality of conditions (e.g., placing a plurality of digital islands if a plurality of tables is detected in a MR environment). For example, a set of conditions can include criteria such that a Digital Island representing a virtual plane is placed in a MR environment on top of a detected real-world plane (or virtual plane) that is within a certain size range, and oriented a specific way, and having a certain amount of light hitting it. As another example, a set of conditions can include criteria such that a Digital Island representing a virtual couch is placed in a MR environment on top of a detected real-world couch (or virtual couch) that is within a certain size range, and oriented a specific way, and having a certain amount of light hitting it.

In accordance with an embodiment, a Digital Island provides a local coordinate system for digital authoring (e.g., by a user). The digital authoring on a Digital Island includes adding one or more digital objects to the Digital Island and wherein the one or more digital objects become part of the Digital Island (e.g., have a fixed size, position and orientation on the Digital Island and have a parent-child relationship wherein the digital object child shares some properties with the Digital Island parent). A local coordinate system for the Digital Island is mapped at runtime to real-world data that matches a set of conditions associated with the Digital Island. For example, if a virtual horse with a given size and orientation is placed on a plane Digital Island representing a table top, and if a real-world table top is detected in an MR environment that satisfies the conditions for the Digital Island (e.g., a real-world table matching size, shape and orientation specified with the conditions), then the plane Digital Island is placed in the MR environment to align with the real-world table top.

In accordance with an embodiment, a condition can include a non-spatial condition including criteria involving light (e.g., an amount of light hitting an object), or color, or texture, physical properties (e.g., hard, soft) and other user-defined properties. The non-spatial conditions define non-spatial boundaries, however, the non-spatial boundary conditions can still be visualized while authoring (e.g., during operation 206 as part of the method 200). An example of a non-spatial condition can be a condition declaring a surface as a 'sofa' having a soft flexible boundary. As part of the example, a boundary for a Digital Island with a sofa condition could be given physics to represent a soft object wherein an object placed on the sofa Digital island would interact with the surface as if the surface were soft and flexible.

Figure 2:
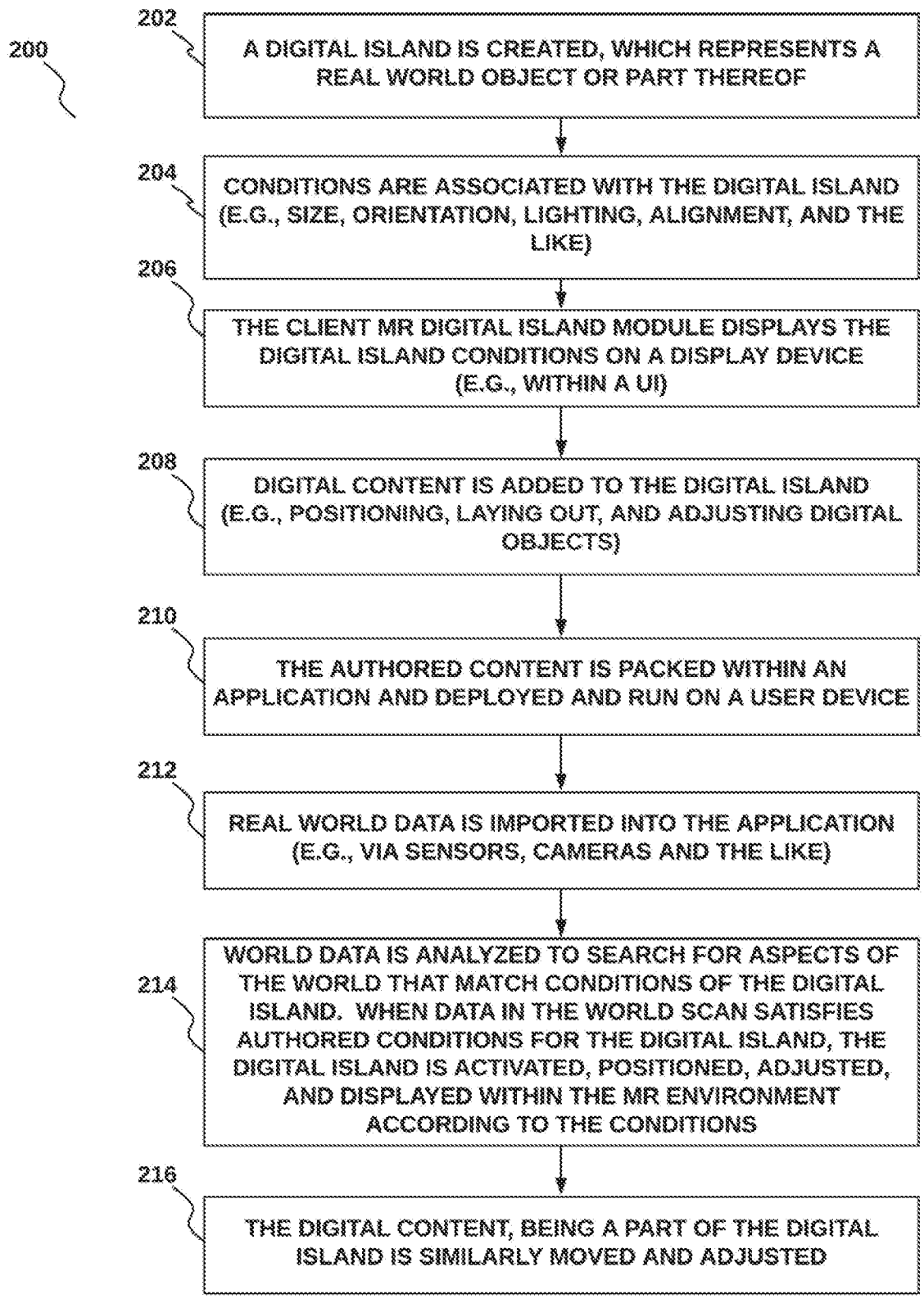
FIG. 2 is a schematic illustrating a flowchart of a method for authoring an MR Digital Island, in accordance with one embodiment.

In accordance with an embodiment and shown in FIG. 2 is a flowchart of a method 200 for creating and autonomously placing a Digital Island in an MR environment. At operation 202 a Digital. Island is created (e.g., by a user 130) which represents a real-world object or part of a real-world object. As part of operation 202, a shape is chosen for the Digital Island. The shape may be a plane, a simple geometric shape (sphere, cube, prism, and the like) or an elaborate 3D model of a complex 3D shape. At operation 204, one or more conditions are associated with the Digital Island (e.g., plane size, lighting requirements, alignment, etc.). At operation 206, the client Mr Digital Island module 124 displays the Digital Island with conditions on a display device 120 (e.g., within a user interface). For example, the Digital. Island may be displayed according to the conditions within a virtual reality headset (e.g., worn by a user 130), allowing the user to experience the conditions in a visual way. The user might see a displayed virtual object in the shape of a plane with a size, alignment and lighting as specified in the conditions. In operation 208, digital content is authored on the Digital Island. The authoring including adding, removing, positioning, orienting and adjusting virtual objects on or within the Digital Island. In accordance with an embodiment, as part of operation 208, the author in may occur directly in a MR environment with digital content added by a user within a MR device MMD. In accordance with another embodiment, as part of operation 208, the authoring may occur within a user interface (e.g., with a user adding digital content via a drag and drop method). At operation 210, the authored content, and Digital Island are packaged within an application (e.g., within a build), and run (e.g., execute) on a MR device 102. At operation 212, real-world data is brought into the application (e.g., imported) using internal and external sensors 116, a camera device 114, and other input devices 118. In accordance with an embodiment, the internal and external sensors 116 capture data as the MR device 102 moves through an environment. The captured data including video data, image data, sound data, infrared depth data, and the like. In accordance with an embodiment, the real-world data can be processed (e.g., with image processing) to extract semantic data of the environment, wherein the extracted semantic data may be added to the real-world data. In accordance with an embodiment, the real-world data can be brought into the application from a pre-existing real-world environment scan (e.g., as an import from the cloud via a network). The real-world data can include data describing surfaces, recognized objects, semantically labeled data, color, light, and the like. In accordance with an embodiment, the world data can come from different sources simultaneously. In operation 214, the world data (e.g., including the semantic data) is analyzed to search for aspects of the environment that match conditions of a Digital island. When data in the MR environment scan (e.g., world data that matches an aspect of the world) satisfies a set of authored conditions for a Digital Island, the Digital Island is activated, positioned, adjusted, and displayed within the MR environment according to the conditions associated with the Digital Island. In some embodiments, the Digital Island is displayed so that some properties of the Digital Island stay in sync with the matching real-world object as the MR device 102 is moved throughout the MR environment (e.g., the Digital Island is displayed on top of its real-world object). At operation 216, the digital content associated with the Digital Island (e.g., at operation 208) is moved and adjusted according to the movement of the MR device 102. Since the authoring in operation 208 was performed with real-world conditions, the displayed Digital Island (e.g., from operation 214) in the MR environment looks as expected.

In accordance with an embodiment, there is provided a method for defining a relationship between two or more Digital Islands. A relationship includes one or more conditions that must be satisfied between a plurality of Digital Islands. A relationship can include one or more conditions that must be common between two or more Digital Islands (e.g., two Digital Islands which have a spherical shape). A relationship can also include a condition which places one or more criteria on a relative distance, orientation, and size between two or more Digital Islands. As an example of a relationship, consider two plane shaped Digital Islands with a relationship condition that includes the following: '2 co-planar surfaces between 3 to 5 meters apart' As part of operation 206 of the method 200, a relationship can be displayed. Continuing the example, the client MR Digital Island module 124 can display the two co-planar surfaces in a user interface on the display device 120. For example, the two co-planar surfaces may be displayed at the average of the constrained distance (e.g., along with showing a minimum distance and a maximum distance). The displayed Digital Islands (e.g., showing the example relationship conditions) allows for 'visual debugging' since it can be determined (e.g., by a user) that digital content placed on the Digital Islands satisfies the relationship condition. For example, visually displaying a relationship can show if two Digital Islands are too far apart to support a character jump, or if digital content is not properly aligned, and the like.

In accordance with an embodiment, at operation 212 of the method 200, data from a simulated environment (e.g., a virtual reality environment) is imported (e.g., instead of data from a real-world environment). The data from a simulated environment may be used in order to test a Digital Island condition without a mobile phone or other MR device to scan a real-world environment.

In accordance with an embodiment, a first Digital Island can be nested inside a second Digital Island. In accordance with the embodiment, at operation 208, data for a first Digital Island is used as the digital content and is added to a second Digital Island so that the first Digital Island exists inside of, or on top of the second Digital Island.

Figure 3A:
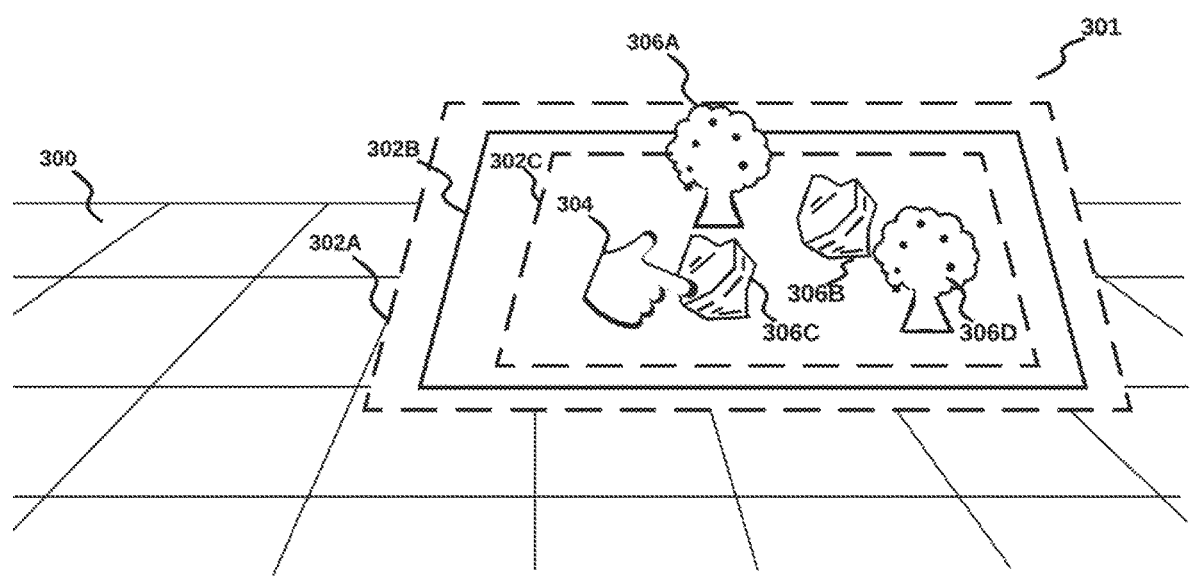
FIG. 3A is a schematic illustrating a view in a virtual environment showing the authoring of a Digital Island, in accordance with one embodiment.

In accordance with an embodiment, and shown in FIG. 3A is a view into a virtual environment 300 that includes a Digital Island 301. The view can be from within a virtual, reality headset or from a user interface on a device (e.g., a desktop computer). The displayed view would be seen by a user as part of opera-ion 206 and operation 208 in the method 200. The Digital Island 301 in the example shown in FIG. 3A is a plane. The real-world conditions for the Digital Island plane are also displayed in the view for a user. For example, conditions for a size-range of a real-world plane that can receive the Digital Island is displayed. In the example in FIG. 3A, the maximum boundary 302A, the minimum boundary 302C and the geometric average boundary 302B are displayed. As part of operation 206, the user can place (e.g., with a virtual hand 304) digital objects (306A, 306B, 306C and 306D) on the Digital Island 301. The digital, objects (306A, 306B, 306C and 306D) added to the Digital Island can be anchored to the Digital Island plane. The digital objects (306A, 306B, 306C and 306D) can be 3D virtual objects that stick out of the Digital Island plane. Because the Digital Island plane 301 shown in FIG. 3A is sized relative to a physical object like a table, a user viewing the display in FIG. 3A can see exactly how the digital objects (306A, 306B, 306C and 306D) shown in the local coordinate system of the Digital Island 301 will be seen in the real-world conditions when displayed in an MR environment on a real-world table.

Figure 3B:
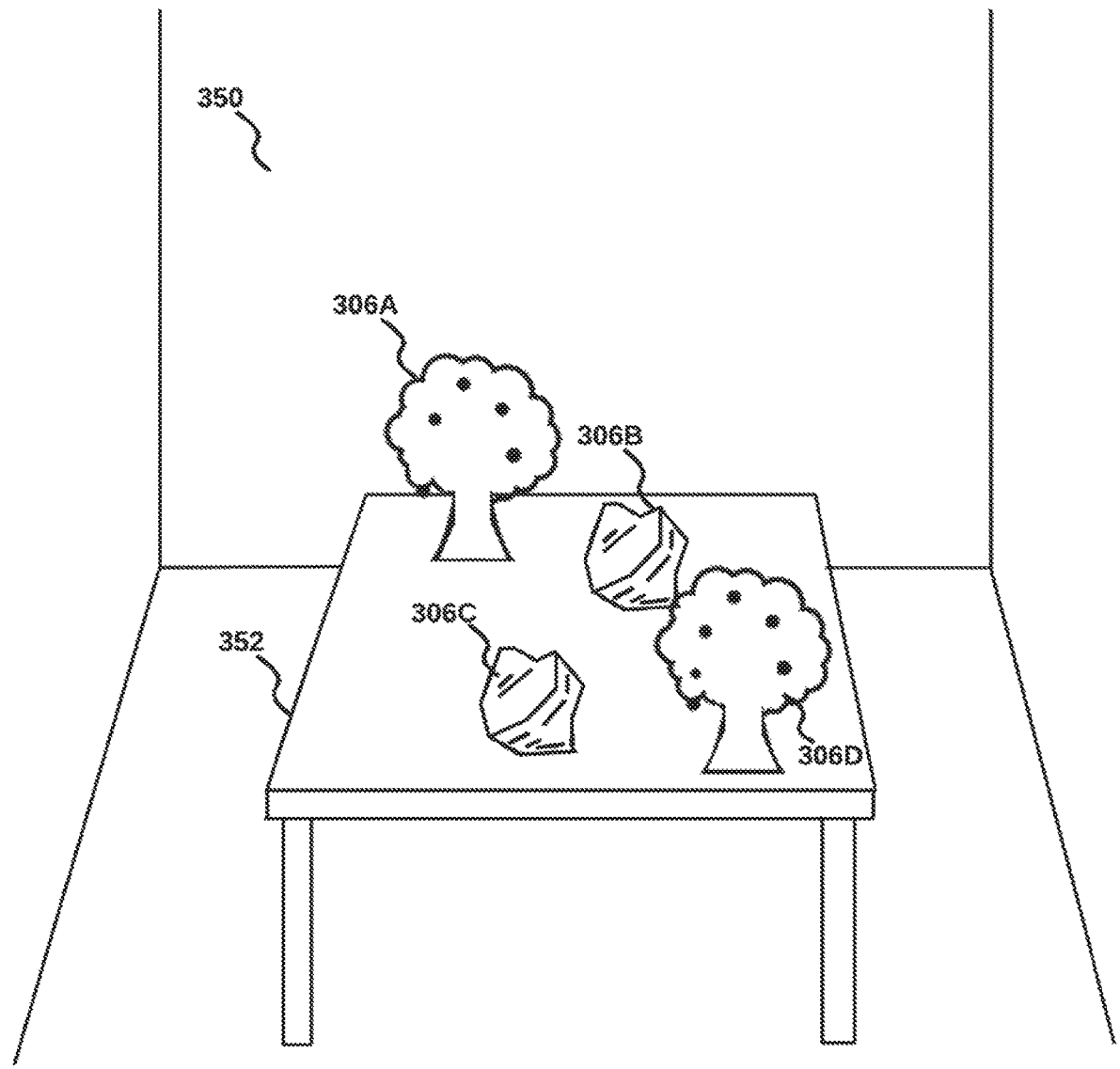
FIG. 3B is a schematic illustrating an MR environment with a Digital Island as seen from an MR device, in accordance with one embodiment.

In accordance with an embodiment and shown in FIG. 3B is a mixed reality environment 350 (e.g., a room) as displayed within a MR device 102 as part of operation 214. The MR environment 350 includes a real physical table 352 which has dimensions that fit within, the minimum 302C and maximum 302A boundaries for the Digital Island 301 shown in FIG. 3A. Upon matching the size and shape of the top surface of the table 352 to the size and shape of the Digital Island 301, the digital objects associated with the Digital Island (306A, 306B, 306C and 306D) are displayed on the table 352 by the client MR digital island module 124. The displayed digital objects are displayed on the table 352 with the same relative size as when they were displayed in the development environment 300 in FIG. 3A. In accordance with an embodiment, the structure (e.g., plane) of the Digital Island 301 is not displayed in the MR environment 350, rather only the added digital objects as part of operation 208 are displayed.

In accordance with an embodiment, the client MR Digital Island module 124 provides a user interface (e.g., on the display device 120) that includes a development environment that contains a virtual environment 300 similar to the environment shown in FIG. 3A. The user interface may include a display for the numerical values of conditions for a Digital Island.

In accordance with an embodiment, a Digital Island may include data that describes a best match of conditions for the Digital Island, whereby the data may be used during operation 214 of the method 200 to determine a preferred matching of conditions with an environment. As an example, a Digital Island may have a condition to match with any object in an environment that is middle-grey or lighter in color, but may also have data describing a best match as an object in the environment with the darkest color within the range of middle-grey or lighter.

In accordance with an embodiment, as part of operation 214 of the method 200, a Digital Island can be replicated and matched up against more than one collection of data from an environment (e.g., several different types of tables within the environment may satisfy conditions for a Digital Island). Based on more than one collection of data from the environment matching conditions for a Digital Island, a unique replica (e.g., copy) of the Digital Island can be matched with each collection of data. In accordance with an embodiment, fuzzy logic may be applied to the conditions of a Digital. Island to allow the Digital island to be matched with a large collection of data.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor, the software transforming the processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understoodto encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 4:
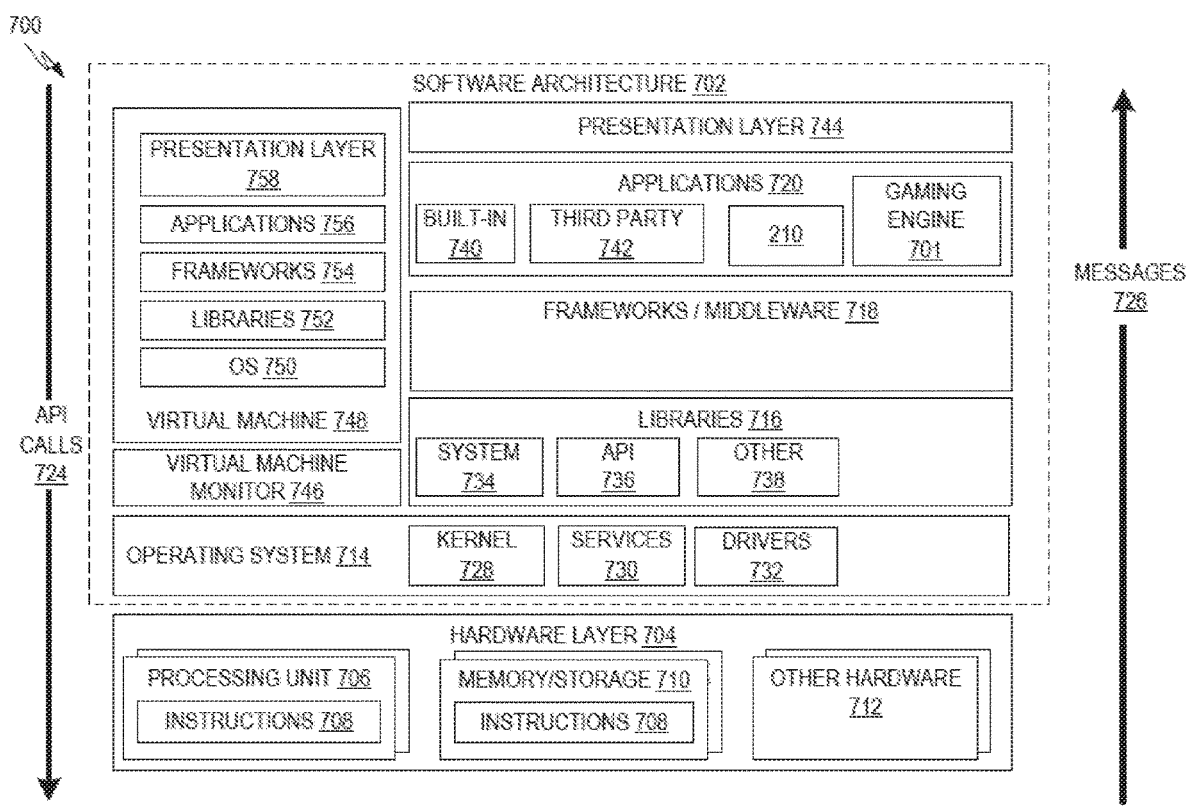
FIG. 4 is a block diagram illustrating an example software architecture, which may be used in conjunction with various hardware architectures described herein.

FIG. 4 is a block diagram 700 illustrating an example software architecture 702, which may be used in conjunction with various hardware architectures herein described to provide a gaming engine 701 and/or components of the MR Digital Island system 100. FIG. 4 is a non-limiting example of a software architecture and it will be appreciated that many other architectures may be implemented to facilitate the functionality described herein. The software architecture 702 may execute on hardware such as a machine 800 of FIG. 5 that includes, among other things, processors 810, memory 830, and input/output (I/O) components 850. A representative hardware layer 704 is illustrated and can represent, for example, the machine 800 of FIG. 5. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which also includes the executable instructions 708. The hardware layer 704 may also comprise other hardware 712.

In the example architecture of FIG. 4, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures have all layers. For example, some mobile or special purpose operating systems may not provide the frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 816 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. In the example of FIG. 4, this is illustrated by a virtual machine 748. The virtual machine 748 creates a software environment where applications/modules can execute as if they were executing on a hardware machine (such as the machine 800 of FIG. 5, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 5:
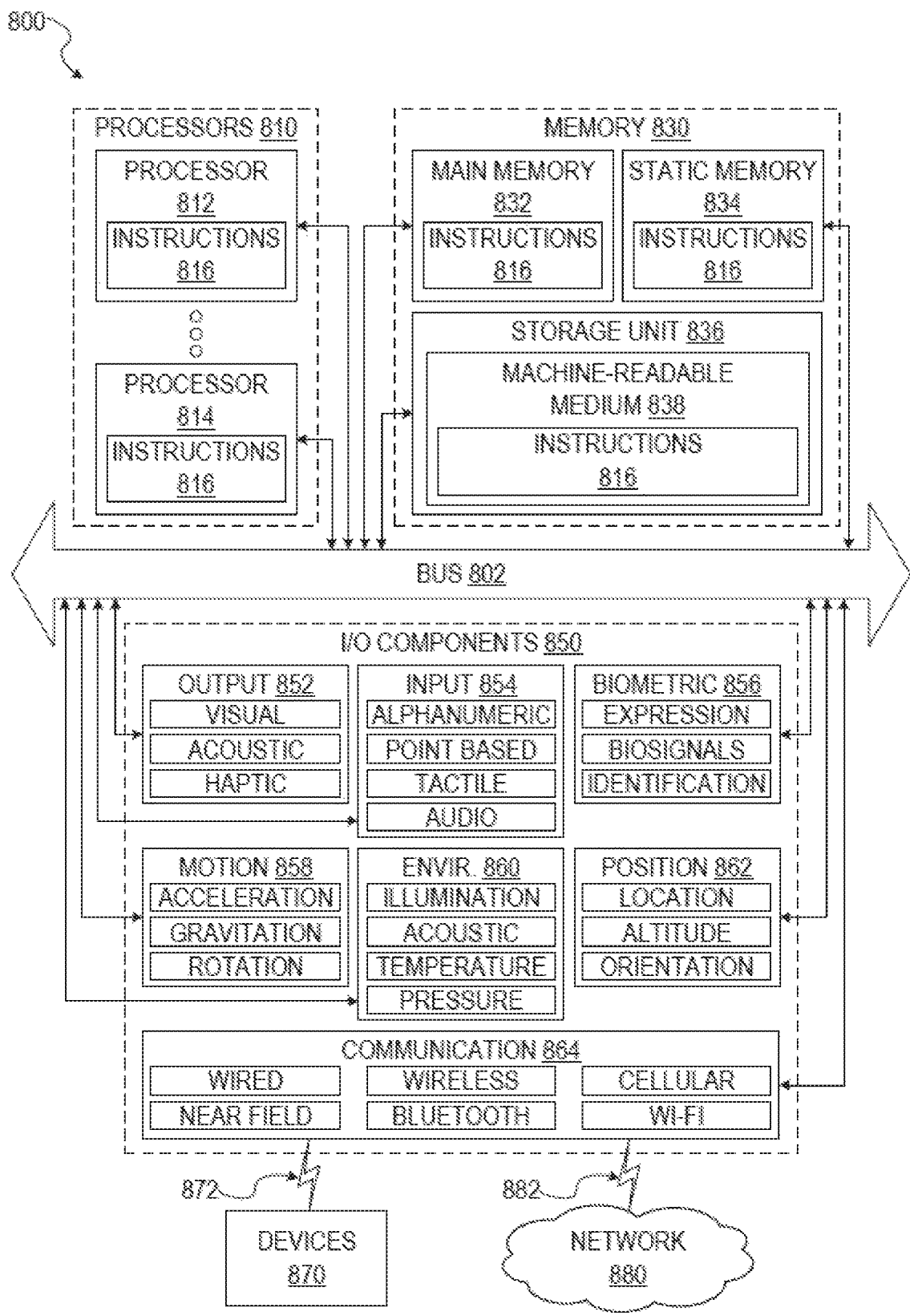
FIG. 5 is a block diagram illustrating components of a machine, according to some example embodiments, configured to read instructions from a machine-readable medium (e.g., a machine-readable storage medium) and perform any one or more of the methodologies discussed herein.

FIG. 5 is a block diagram illustrating components of a machine 800, according to some example embodiments, configured to read instructions from a machine-readable medium (e.g., a machine-readable storage medium) and perform any one or more of the methodologies discussed herein. In some embodiments, the machine 110 is similar to the HMD 102. Specifically, FIG. 5 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 5 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of processors 810 are examples of machine-readable media 838.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/ output (I/O) components 850 may include many other components that are not shown in FIG. 5. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 862, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

I claim:

1. A system comprising:
one or more computer processors;
one or more computer memories;
one or more modules incorporated into the one or more computer memories, the one or more modules configuring the one or more computer processors to perform operations for generating a digital island, the operations comprising:
creating a base shape of a digital island virtual object with respect to a local coordinate system of the digital island;
associating conditions with the digital island, the conditions including criteria for properties of objects within an environment, the environment being a virtual environment or a real-world environment;
associating additional virtual objects with the digital island;
receiving data describing the environment, the data describing the environment being created from a sensor scan;
analyzing the data to determine one or more parts of the environment that match the conditions;
based on the matching of the conditions, positioning, scaling, and orienting a display of the digital island and the associated additional virtual objects in a mixed reality display device contemporaneously with a view of the environment; and
aligning the digital island with at least one part of the one or more parts based on the conditions and a movement of one or more sensors and the mixed reality display device.

2. The system of claim 1, wherein the data describing the environment is received from the one or more sensors within the environment.

3. The system of claim 1, wherein the data describing the environment is received from a database over a network.

4. The system of claim 1, wherein the associating of the additional virtual objects with the digital island is done using a drag and drop method within a mixed reality environment.

5. The system of claim 1, wherein the one or more sensors include at least one of the following: cameras and depth sensors.

6. The system of claim 1, wherein the criteria for properties of objects within an environment include specifying one or more of the following: geometry of the object, a texture of the object, a relative placement of the object within the environment, color of the object, and lighting of the object.

7. A method comprising:
creating a base shape of a digital island virtual object with respect to a local coordinate system of a digital island;
associating conditions with the digital island, the conditions including criteria for properties of objects within an environment, the environment being a virtual environment or a real-world environment;
associating additional virtual objects with the digital island;
receiving data describing the environment, the data describing the environment being created from a sensor scan;
analyzing the data to determine one or more parts of the environment that match the conditions;
based on the matching of the conditions, positioning, scaling, and orienting a display of the digital island and the associated additional virtual objects in a mixed reality display device contemporaneously with a view of the environment; and
aligning the digital island with at least one part of the one or more parts based on the conditions and a movement of one or more sensors and the mixed reality display device.

8. The method of claim 7, wherein the data describing the environment is received from the one or more sensors within the environment.

9. The method of claim 7, wherein the data describing the environment is received from a database over a network.

10. The method of claim 7, wherein the associating of the additional virtual objects with the digital island is done using a drag and drop method within a mixed reality environment.

11. The method of claim 7, wherein the one or more sensors include at least one of the following: cameras and depth sensors.

12. The method of claim 7, wherein the criteria for properties of objects within an environment include specifying one or more of the following: a geometry of the object, a texture of the object, a relative placement of the object within the environment, color of the object, and lighting of the object.

13. A non-transitory machine-readable storage medium storing a set of instructions that, when executed by one or more computer processors, cause the one or more computer processors to perform operations comprising:
creating a base shape of a digital island virtual object with respect to a local coordinate system of a digital island;
associating conditions with the digital island, the conditions including criteria for properties of objects within an environment, the environment being a virtual environment or a real-world environment;
associating additional virtual objects with the digital island;
receiving data describing the environment, the data describing the environment being created from a sensor scan;
analyzing the data to determine one or more parts of the environment that match the conditions;
based on the matching of the conditions, positioning, scaling, and orienting a display of the digital island and the associated additional virtual objects in a mixed reality display device contemporaneously with a view of the environment; and
aligning the digital island with at least one part of the one or more parts based on the conditions and a movement of one or more sensors and the mixed reality display device.

14. The non-transitory machine-readable storage medium of claim 13, wherein the data describing the environment is received from the one or more sensors within the environment.

15. The non-transitory machine-readable storage medium of claim 13, wherein the data describing the environment is received from a database over a network.

16. The non-transitory machine-readable storage medium of claim 13, wherein the associating of the additional virtual objects with the digital island is done using a drag and drop method within a mixed reality environment.

17. The non-transitory machine-readable storage medium of claim 13, wherein the one or more sensors include at least one of the following: cameras and depth sensors.

* * * * *

UNITED STATES PATENT AND TRADEMARK OFFICE
CERTIFICATE OF CORRECTION

PATENT NO. : 11,017,605 B2
APPLICATION NO. : 16/660746
DATED : May 25, 2021
INVENTOR(S) : Andrew Peter Maneri Page 1 of 1

It is certified that error appears in the above-identified patent and that said Letters Patent is hereby corrected as shown below:

In the Claims

In Column 17, Line 49, in Claim 6, before "geometry", insert --a--

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*